(12) United States Patent
Zhu et al.

(10) Patent No.: US 7,845,812 B2
(45) Date of Patent: Dec. 7, 2010

(54) LIGHT GUIDE PLATE AND DIRECT-TYPE BACKLIGHT MODULE WITH SAME

(75) Inventors: Jun Zhu, Beijing (CN); He Zhang, Beijing (CN); Guo-Fan Jin, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 208 days.

(21) Appl. No.: 12/135,850

(22) Filed: Jun. 9, 2008

(65) Prior Publication Data
US 2009/0040768 A1  Feb. 12, 2009

(30) Foreign Application Priority Data
Aug. 8, 2007  (CN) .................. 2007 1 0075633

(51) Int. Cl.
*G09F 13/04*  (2006.01)
*G09F 13/08*  (2006.01)

(52) U.S. Cl. .............. 362/97.3; 362/97.2; 362/612
(58) Field of Classification Search ............... 362/97.2, 362/97.3, 244, 249.02, 612
See application file for complete search history.

(56) References Cited

U.S. PATENT DOCUMENTS

2005/0180124 A1*  8/2005  Adachi et al. ............ 362/30
2007/0189024 A1*  8/2007  Nanbu et al. ............ 362/458

FOREIGN PATENT DOCUMENTS

JP  10-82916  3/1998

* cited by examiner

*Primary Examiner*—Stephen F Husar
(74) *Attorney, Agent, or Firm*—Andrew C. Cheng

(57) ABSTRACT

An exemplary backlight module includes a light guide plate and light sources. The light guide plate includes a block body and the recessed parts. The block body has a top light output surface and a bottom surface. The recessed parts are provided at the bottom surface. The light sources are disposed at least partly in or adjacent to the recessed parts.

11 Claims, 6 Drawing Sheets

LIGHT GUIDE PLATE AND DIRECT-TYPE BACKLIGHT MODULE WITH SAME

BACKGROUND

1. Technical Field

The invention relates to backlight modules and light guide plates, and particularly to a light guide plate and a backlight module typically used in a liquid crystal display.

2. Description of Related Art

Currently, because liquid crystal displays (LCDs) are thin, lightweight, long lasting, and consume little power, they are extensively used in a variety of electronic devices. However, LCDs are not self-luminescent, therefore, backlight modules are typically required. Generally, backlight modules can be categorized as either direct-type backlight modules or edge-type backlight modules. Because direct-type backlight modules can provide high illumination in comparison with edge-type backlight modules, direct-type backlight modules are more widely employed in numerous applications.

Referring to FIG. 1, a conventional direct-type backlight module 2 includes a reflection plate 21, a plurality of LED packages 22, a light guide plate 23, and a diffusion plate 24. The LED packages 22 are disposed on the reflection plate 21. In addition, each of the LED packages 22 includes a reflective layer 221 disposed thereon. The light guide plate 23 is disposed above and is spaced apart from the reflective layer 221a predetermined distance. The light guide plate 23 includes a light output surface 231 that faces the diffusion plate 24. The diffusion plate 24 is disposed above and is spaced apart from the light guide plate 23 a predetermined distance.

Light emitted from an LED of each LED package 22 is reflected by the reflective layer 221 and the reflection plate 21 in succession to be redirected into the light guide plate 23. The light guide plate 23 allows the light from all the LED packages 22 to be redistributed, and guides the light to exit from the light output surface 231. The diffusion plate 24 is configured to emit the light uniformly to the display panel of an associated LCD device.

The predetermined distance between the reflective layer 221 and the light guide plate 23 is required to provide uniform illumination. This means reducing the volume of the LCD device for compact applications is difficult. Moreover, because the light is reflected by both the reflective layer 221 and the reflection plate 21, light energy is lost. This can make operation of the LCD device inefficient.

What is needed, therefore, is a light guide plate and a direct-type backlight module with same which are suitable for compact applications and which provide improved efficiency.

SUMMARY

A direct-type backlight module is provided. In one embodiment, the backlight module includes a light guide plate and at least one light source. The light guide plate includes a block body having a top light output surface and a bottom surface. The block body includes at least one recessed part provided at the bottom surface. The light source is disposed at partly in or adjacent to the recessed part.

A light guide plate is also provided. In one embodiment, the light guide plate includes a block body and at least one recessed part. The block body includes a top light output surface and a bottom surface. The recessed part is provided at the bottom surface of the block body. The recessed part is configured for at least partly accommodating at least one light source or receiving light beams from at least one corresponding adjacent light source.

Advantages and novel features of the present light guide plate and direct-type backlight module with same will become more apparent from the following detailed description of preferred embodiments when taken in conjunction with the accompanying drawings.

BRIEF DESCRIPTION OF THE DRAWINGS

The components in the drawing are not necessarily drawn to scale, the emphasis instead being placed upon clearly illustrating the principles of the present light guide plate and direct-type backlight module with same. In the drawings, all the views are schematic.

Figure 1:
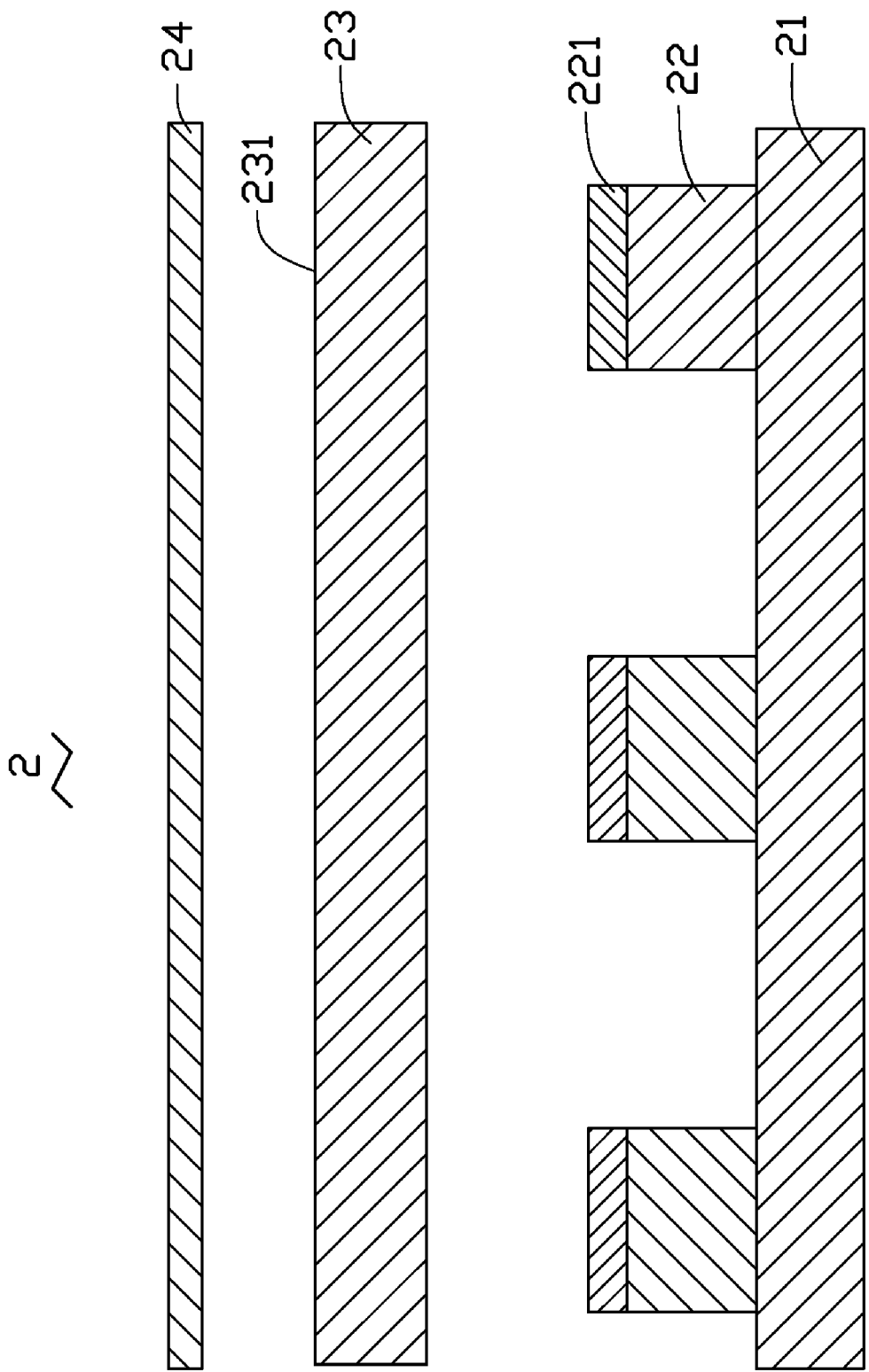
FIG. 1 is an exploded, cross-sectional view of a conventional backlight module.

Corresponding reference characters indicate corresponding parts throughout the several views. The exemplifications set out herein illustrate at least four preferred or exemplary embodiments of the present backlight module, in various forms, and such exemplifications are not to be construed as limiting the scope of the invention in any manner.

DETAILED DESCRIPTION OF EMBODIMENTS

Reference will now be made to the drawings to describe various embodiments of the present light guide plate and direct-type backlight module with same in detail.

Figure 2:
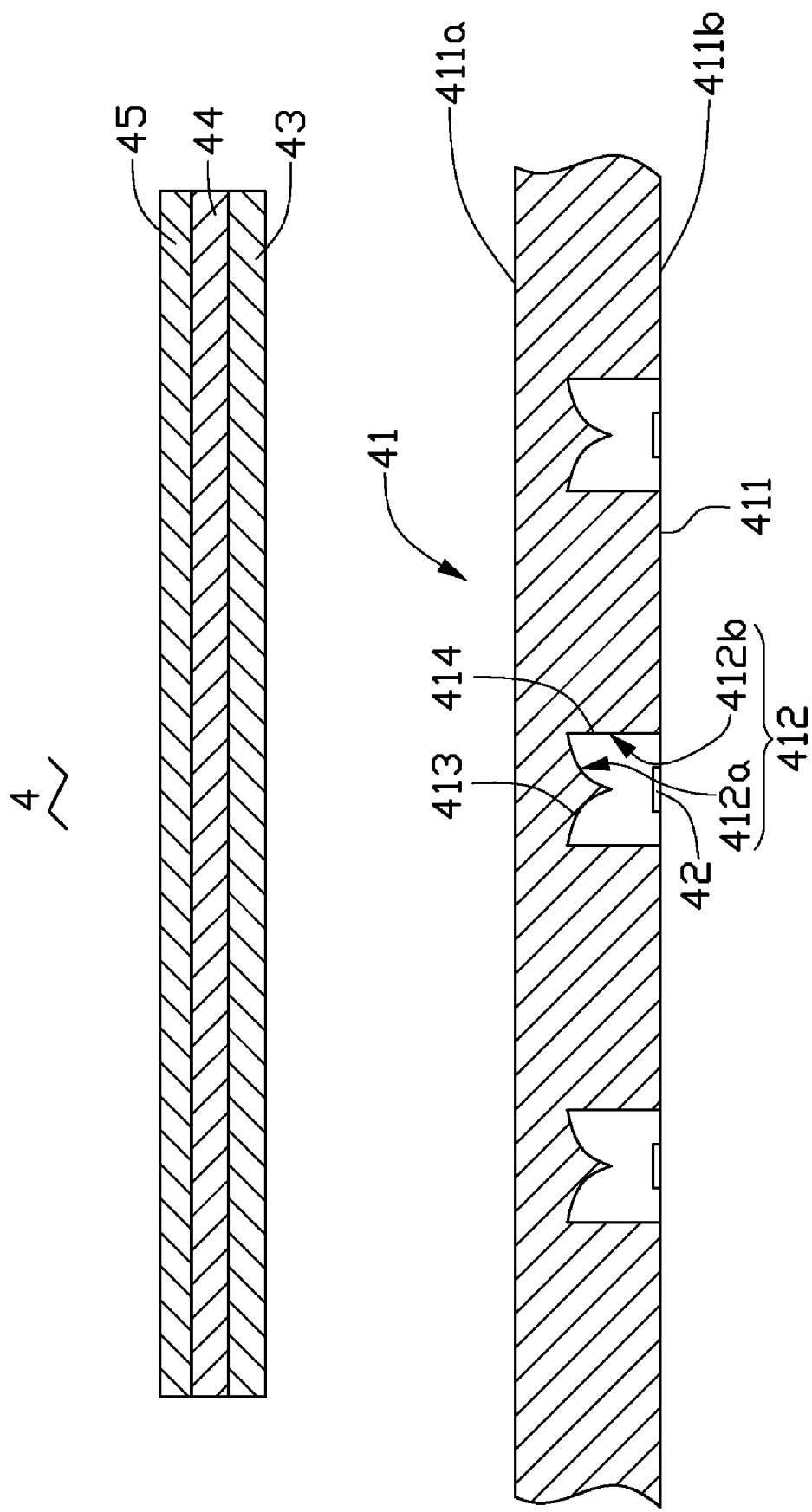
FIG. 2 is an exploded, cross-sectional view of a direct-type backlight module in accordance with a first preferred embodiment of the present invention, showing part of a light guide plate thereof somewhat enlarged, the light guide plate including a plurality of recessed parts.

Referring to FIG. 2, a backlight module 4 according to a first embodiment of the present invention is shown. The backlight module 4 includes a light guide plate 41 and at least one light source 42. In the illustrated embodiment, the backlight module 4 has a plurality of the light sources 42, as an example. Typically, the backlight module 4 is configured for use in an LCD device (not shown).

The light guide plate 41 includes a block body 411 having a top light output surface 411a, a lateral surface, and a bottom surface 411b. The lateral surface interconnects the light output surface 411a and the bottom surface 411b. The block body 411 includes at least one recessed part 412. In the illustrated embodiment, the block body 411 has a plurality of the recessed parts 412, as an example. In the present embodiment, the light guide plate 41 is sheet-shaped. The bottom surface 411b is parallel to the light output surface 411a. The light guide plate 41 is made of transparent material, such as glass or polymethyl methacrylate (PMMA).

Figure 3:
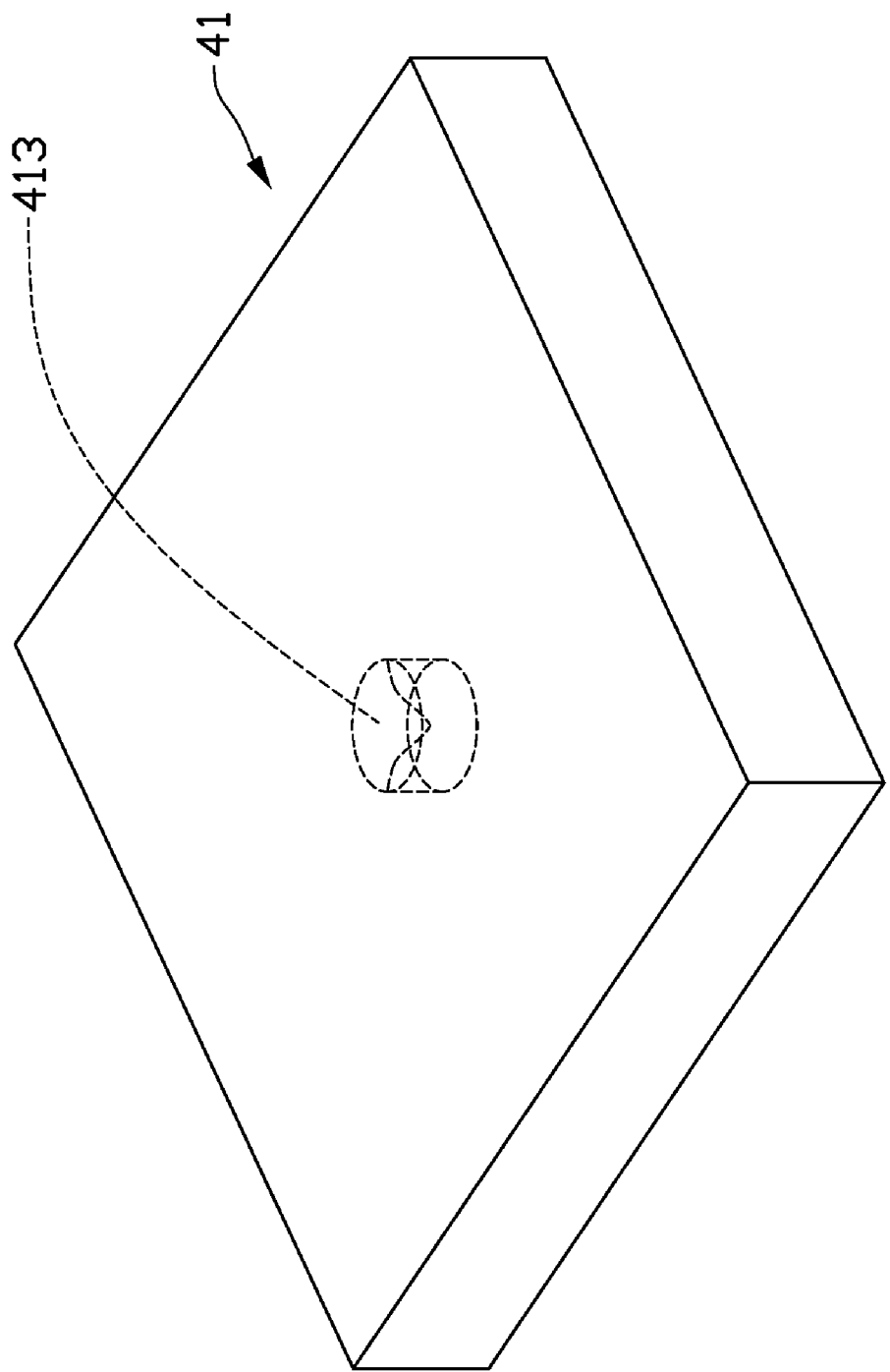
FIG. 3 is an isometric view of the light guide plate of the direct-type backlight module of the first preferred embodiment, showing one of the recessed parts in phantom.

The recessed parts 412 are provided at the bottom surface 411b of the block body 411. Referring also to FIG. 3, the recessed parts 412 are receptacle-like structures set in from the bottom surface 411b, and act as light receiving areas. Advantageously, the recessed parts 412 are generally cylindrical. Alternatively, the recessed parts 412 may be generally frustum-shaped. In the present embodiment, the block body 411 further includes at least one top protrusion 413 protruding down into each of the recessed parts 412. Suitably, the top protrusion 413 is generally conical. The top protrusion 413 has a reflective surface 412a. Additionally, each of the recessed parts 412 has a peripheral side wall 414 surrounding a periphery of the top protrusion 413 serves as an incident surface 412b. The reflective surface 412a adjoins the incident surface 412b.

The reflective surface 412a of the top protrusion 413 is configured to reflect light from the corresponding light source 42 to the incident surface 412b. In particular, the reflective surface 412a can be coated with reflective material. The reflective material chosen for coating the reflective surface 412a is dependent on what reflective efficiency should be achieved in practice.

In the illustrated embodiment, a central cross-section of the conical top protrusion 413 of each recessed part 412 defines two symmetrically opposite, concave lines. The lines can for example be arc-shaped. When light strikes the curved reflective surface 412a of the top protrusion 413, it is reflected to the incident surface 412b and enters the block body 411 through the incident surface 412b. The shapes of the recessed part 412 and the top protrusion 413 are not limited to what is described above and illustrated. Any suitable shapes that allow the reflective surface 412a to redirect light into the light guide plate 41 via the incident surface 412b may be employed.

Figure 4:
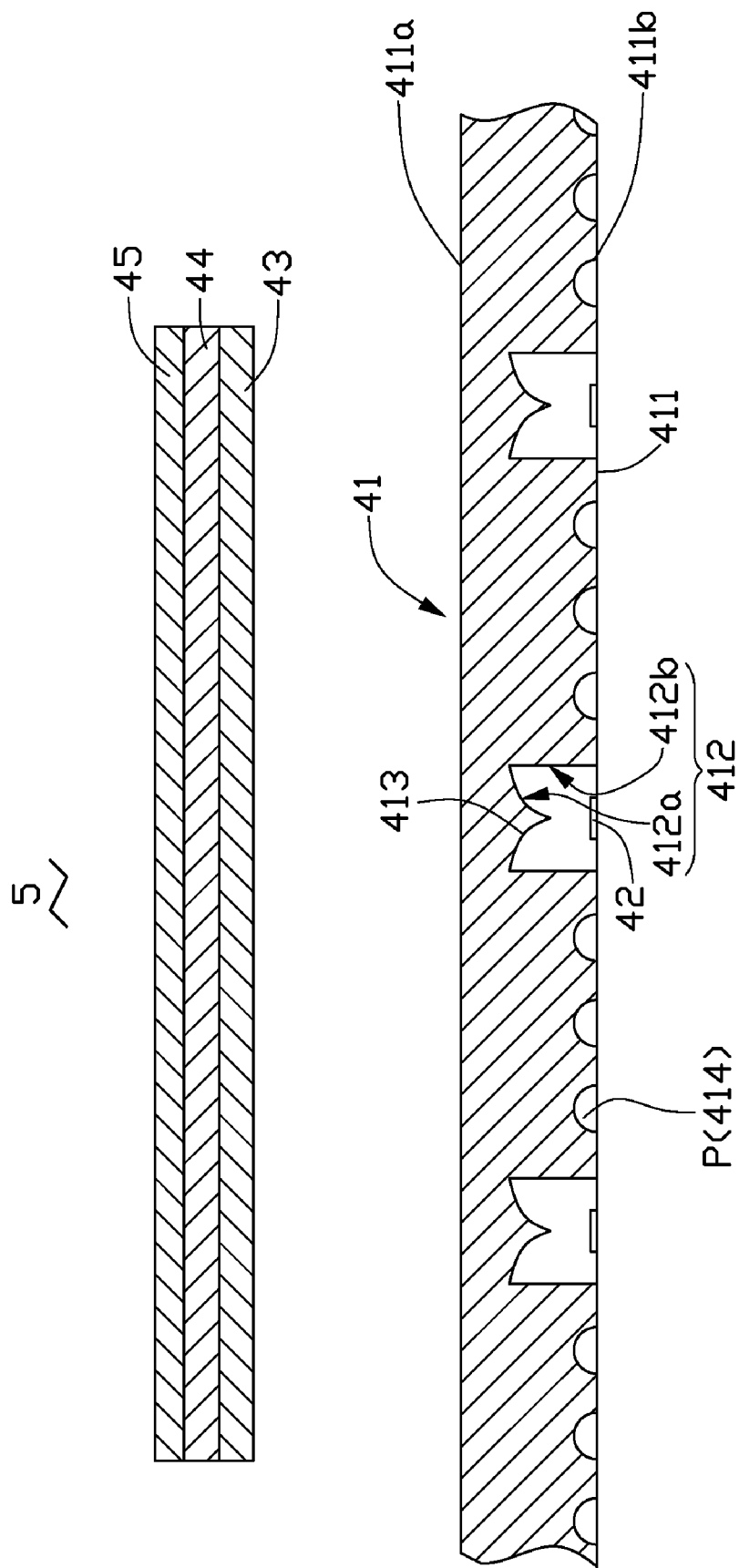
FIG. 4 is an exploded, cross-sectional view of a direct-type backlight module in accordance with a second preferred embodiment of the present invention, showing part of a light guide plate thereof somewhat enlarged.

Referring to FIG. 4, a backlight module 5 according to a second embodiment of the present invention is shown. The backlight module 5 is similar to the backlight module 4. However, in the backlight module 5, the block body 411 further includes a scattering dot array P disposed at the bottom surface 411b. The scattering dot array P includes a plurality of dots 414 arranged at the bottom surface 411b in a regular pattern. The scattering dot array P is configured to scatter incident light propagating within the block body 411, and thereby uniformly transmit the light to the light output surface 411a of the light guide plate 41. In the illustrated embodiment, the dots 414 are in the form of recesses. For enhancing reflection efficiency, the bottom surface 411b and exposed surfaces of the dots 414 can be coated with highly reflective material. In addition, the backlight module 5 can further include an optical film (not shown), such as a brightness enhancement film (BEF) or a light scattering film, disposed above the light output surface 411a. The optical film increases the brightness of a display panel (not shown) of the LCD device.

In the present embodiment, the light sources 42 are disposed entirely within the recessed parts 412, in alignment with the protrusions 413 and generally flush with the bottom surface 411b. The light source 42 is typically at least one light-emitting diode (LED), such as a single-color LED or a multi-color LED.

Figure 5:
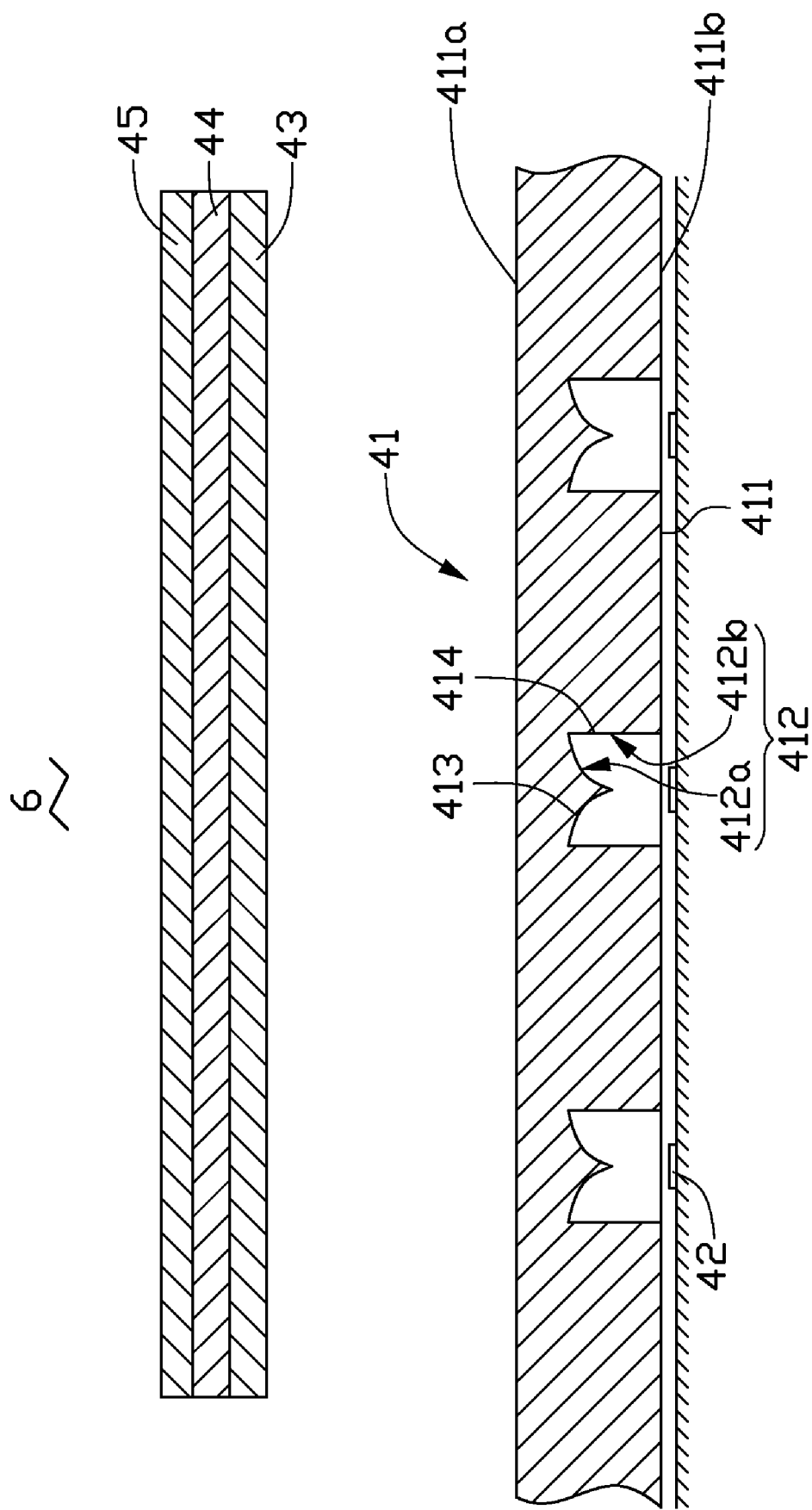
FIG. 5 is an exploded, cross-sectional view of a direct-type backlight module in accordance with a third preferred embodiment of the present invention, showing part of a light guide plate thereof somewhat enlarged.

Referring to FIG. 5, a backlight module 6 according to a third embodiment of the present invention is shown. The backlight module 6 is similar to the backlight module 4. However, in the backlight module 6, the light sources 42 are disposed entirely outside, but adjacent to, the recessed parts 412. In this embodiment, it is understood that the light sources 42 can be fastened on some portion of the associated LCD device, e.g. a housing of LCD device. In alternative embodiments, each light source 42 can be disposed partly within the corresponding recessed part 412 and partly outside the corresponding recessed part 412.

Referring to FIG. 2, FIG. 4 and FIG. 5, each of the backlight modules 4, 5 and 6 further includes a microprism plate 43, a polarization plate 44, and a diffusing plate 45 sequentially disposed in that order from bottom to top above the light output surface 411a of the light guide plate 41. The microprism plate 43 is configured to better focus light along desired paths. The polarization plate 44 is between the microprism plate 43 and the diffusing plate 45. The polarization plate 44 is configured to polarize and modulate the light passing therethrough. The diffusing plate 45 is configured to enhance the uniformity of distribution of light that passes from the backlight module 4, 5 or 6 to the display panel.

Figure 6:
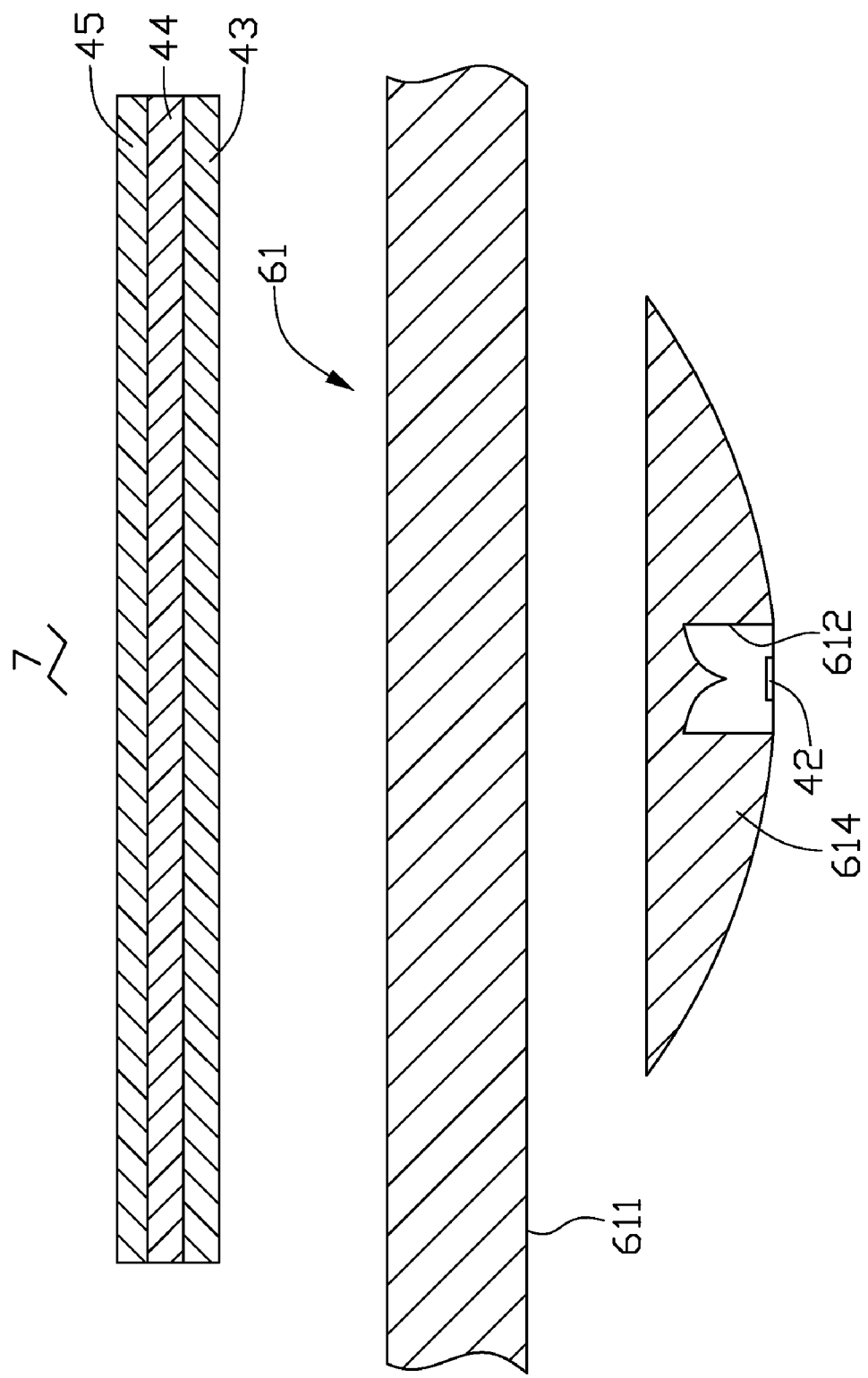
FIG. 6 is an exploded, cross-sectional view of a direct-type backlight module in accordance with a fourth preferred embodiment of the present invention, showing part of a light guide plate thereof somewhat enlarged.

Referring to FIG. 6, a backlight module 7 according to a fourth embodiment of the present invention is shown. The backlight module 7 is similar to the backlight module 4. The difference is that a block body 611 of a light guide plate 61 has at least one bulge 614 at a bottom surface 611b of the light guide plate 61. In addition, at least one recessed part 612 is defined at the bottom surface 611b at a middle of the bulge 614. In the present embodiment, the bulge 614 is integrally formed with the block body 611. Alternatively, the bulge 614 can be separately formed and adhered to the block body 611. In the illustrated embodiment, the bulge 614 is in the shape of a very shallow truncated circular cone.

In conclusion, at least one recessed part at the bottom surface of the light guide plate is provided. The light emitting from the corresponding at least one light source is reflected by the reflective surface into the light guide plate via the incident surface. Unlike in conventional art, one or more elements, such as a reflection plate that is normally used to redirect light into the light guide plate, are not needed to achieve a backlight module. Therefore, the present backlight module can occupy a minimum volume. In addition, many or most of the light beams emitting from the light source and directly reaching the incident surface have a relatively small angle of incidence. This means a majority of such light beams directly enter the light guide plate via the incident surface. Thus, the amount of light eventually distributed to the display panel is increased, for achieving higher illumination.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A light guide plate, comprising:
   a block body including a top light output surface and a bottom surface; and
   at least one recessed part provided at the bottom surface, each of the at least one recessed part configured for at least partly accommodating a corresponding light source or for receiving light beams from a corresponding light source adjacent the at least one recessed part, wherein the block body further comprises a top protrusion protruding down into the at least one recessed part, and the top protrusion has a reflective surface concaved toward the block body.

2. The light guide plate as claimed in claim 1, wherein the at least one recessed part is a receptacle-like structure set in from the bottom surface, and the at least one recessed part is generally cylindrical or generally frustum-shaped.

3. The light guide plate as claimed in claim 1, wherein the at least one recessed part has a peripheral side wall surrounding a periphery of the top protrusion, and the peripheral side wall serves as an incident surface of the block body.

4. The light guide plate as claimed in claim 1, wherein the at least one light source is at least one light-emitting diode.

5. The light guide plate as claimed in claim 1, wherein the block body comprises at least one bulge at the bottom surface, the at least one recessed part being disposed at a center of the at least one bulge.

6. The light guide plate as claimed in claim 5, wherein the at least one bulge comprises a plurality of bulges which are separately formed and adhered to the block body.

7. The light guide plate as claimed in claim 3, wherein the reflective surface adjoins the incident surface.

8. The light guide plate as claimed in claim 1, further comprising a scattering dot array disposed at the bottom surface, and the scattering dot array comprises a plurality of dots arranged at the bottom surface in a regular pattern.

9. The light guide plate as claimed in claim 8, wherein the bottom surface and exposed surfaces of the plurality of dots are coated with reflective material.

10. A direct-type backlight module, comprising:

a light guide plate comprising a block body including a top light output surface and a bottom surface, wherein the block body comprises at least one bulge adhered to the bottom surface of the block body, and at least one recessed part is provided at the bottom surface and disposed at a center of the at least one bulge; and at least one light source disposed at least partly in or adjacent to the at least one recessed part.

11. The direct-type backlight module as claimed in claim 10, wherein the at least one light source is disposed partly within the corresponding recessed part and partly outside the corresponding recessed part.

\* \* \* \* \*